United States Patent
Kaneko

(10) Patent No.: US 9,335,990 B2
(45) Date of Patent: May 10, 2016

(54) METHOD, A SYSTEM, AND A NON-TRANSITORY COMPUTER-READABLE MEDIUM FOR SUPPORTING APPLICATION DEVELOPMENT

(71) Applicant: Kyocera Document Solutions Inc., Osaka (JP)

(72) Inventor: Kotaro Kaneko, Osaka (JP)

(73) Assignee: Kyocera Document Solutions Inc., Osaka (JP)

(*) Notice: Subject to any disclaimer, the term of this patent is extended or adjusted under 35 U.S.C. 154(b) by 0 days.

(21) Appl. No.: 14/579,126

(22) Filed: Dec. 22, 2014

(65) Prior Publication Data

US 2015/0178074 A1   Jun. 25, 2015

(30) Foreign Application Priority Data

Dec. 25, 2013 (JP) ................. 2013-266531

(51) Int. Cl.
  *G06F 9/445* (2006.01)
  *G06F 9/44* (2006.01)
(52) U.S. Cl.
  CPC ....................... *G06F 8/71* (2013.01)
(58) Field of Classification Search
  None
  See application file for complete search history.

(56) References Cited

U.S. PATENT DOCUMENTS 5,835,777 A * 11/1998 Staelin ................ G06F 8/61
                                              717/175

FOREIGN PATENT DOCUMENTS

JP      10269065       10/1998

* cited by examiner

*Primary Examiner* — Qamrun Nahar
(74) *Attorney, Agent, or Firm* — K&L Gates LLP

(57) ABSTRACT

An application development support method of the present disclosure is for generating an application by building resources including a library and a manifest file. The method includes extracting, when there are a plurality of versions of a platform being an operation target for the application, the library commonly required by all the versions of the platform from a specified resource storing area. The method includes identifying and extracting the library that is required other than commonly required by all the versions of the platform from the specified resource storing area. The method includes inquiring about a public interface relating to an un-extracted library in the specified resource storing area. The method includes generating a manifest file for a difference detected when inquiring about the public interface. The method includes connecting the generated manifest file with an existing manifest file.

9 Claims, 3 Drawing Sheets

METHOD, A SYSTEM, AND A NON-TRANSITORY COMPUTER-READABLE MEDIUM FOR SUPPORTING APPLICATION DEVELOPMENT

INCORPORATION BY REFERENCE

This application is based on, and claims priority to corresponding Japanese Patent Application No. 2013-266531, filed in the Japan Patent Office on Dec. 25, 2013, the entire contents of which are incorporated herein by reference.

FIELD

Unless otherwise indicated herein, the description in this field section or the background section is not prior art to the claims in this application and is not admitted to be prior art by inclusion in this section. The present disclosure relates to an application development support method, a system, and a non-transitory computer-readable medium for supporting application development.

BACKGROUND

In general, a development environment is necessary for generating applications. A specific application is generated by utilizing this development environment. For the specific application, there exists a platform identified by a version on which the application can be performed. A representative example of this platform is an operating system. A typical development environment supports a plurality of versions of the platform. Files, libraries, and the like necessary for an application differ in accordance with the version of the platform. The typical development environment needs to determine which files, libraries, and the like are necessary for the platform specified when the application is built or the application is installed.

Various techniques for enhancing user convenience are provided as development environment techniques. For example, known techniques regarding library management methods in a software development environment and a software execution environment include a library management method which allows addition, modification, and deletion of rules relating to a library configuration. The object of the library management method is to obtain, from integration information which shows a currently integrated software configuration, combinations of an integration destination, a configuration name, and a version one by one, check integration destinations violating a configuration rule, and display the integration destinations violating the configuration rule.

The library management method, in which a management table is used, is not suitable for an environment in which modifications are frequently performed, and man-power regarding the modifications is large.

SUMMARY

The present disclosure relates to an application development support method, a system, and a non-transitory computer-readable medium for supporting application development, which generate an application for a platform having a plurality of versions.

An application development support method of the present disclosure can generate an application by building resources including a library and a manifest file. The method includes extracting, when there are a plurality of versions of a platform being an operation target for the application, the library commonly required by all the versions of the platform from a specified resource storing area. The method includes: identifying and extracting the library that is required other than commonly required by all the versions of the platform from the specified resource storing area; inquiring about a public interface relating to an un-extracted library in the specified resource storing area; generating a manifest file for a difference detected when inquiring about the public interface; and connecting the generated manifest file with an existing manifest file.

An application development support system for generating an application of the present disclosure includes a build resource storing unit, a file extraction unit, an interface inquiry unit, and a manifest file generation unit. The build resource storing unit includes a library and a manifest file. The file extraction unit extracts, when there are a plurality of versions of a platform being an operation target for the application, the library commonly required by all the platforms, and identifies and extracts the library that is required other than commonly required by all the versions of the platform from a specified resource storing area. The interface inquiry unit inquires about a public interface relating to an un-extracted library in the resource storing area. The manifest file generation unit generates a manifest file for a difference detected by the interface inquiry unit, and connects the generated manifest file with an existing manifest file.

A non-transitory computer-readable medium having instructions stored thereon of the present disclosure generates an application by building resources including a library and a manifest file. The non-transitory computer-readable medium causes a computer and peripheral devices to perform the following operations. The operations include: extracting, when there are a plurality of versions of a platform being an operation target for the application, the library commonly required by all the versions of the platform from a specified resource storing area; identifying and extracting the library that is required other than commonly required by all the versions of the platform from the specified resource storing area; inquiring about a public interface relating to an un-extracted library in the specified resource storing area; generating a manifest file for a difference detected when inquiring about the public interface; and connecting the generated manifest file with an existing manifest file.

Additional features and advantages are described herein, and will be apparent from the following Detailed Description and the figures.

BRIEF DESCRIPTION OF FIGURES

All drawings are intended to illustrate some aspects and examples of the present disclosure. The drawings described are only schematic and are non-limiting, and are not necessarily drawn to scale.

DETAILED DESCRIPTION

Various embodiments are described below with reference to the figures. It should be understood, however, that numerous variations from the depicted arrangements and functions are possible while remaining in the scope and spirit of the claims. For instance, one or more elements may be added, removed, combined, distributed, substituted, re-positioned, re-ordered, and/or otherwise changed. Further, where this description refers to one or more functions being implemented on and/or by one or more devices, one or more machines, and/or one or more networks, it should be understood that one or more of such entities could carry out one or more of such functions by themselves or in cooperation, and may do so by application of any suitable combination of hardware, firmware, and/or software. For instance, one or more processors may execute one or more sets of programming instructions as at least part of carrying out one or more of the functions described herein.

Figure 1:
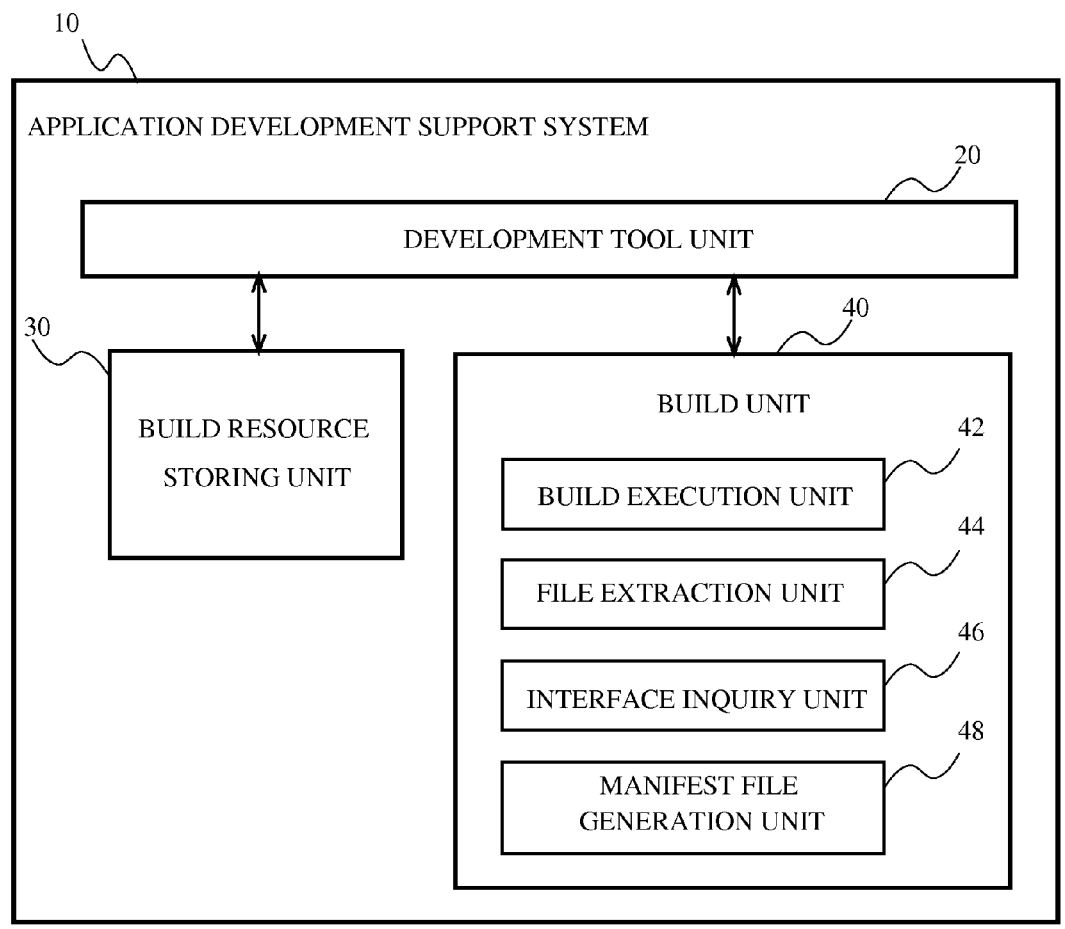
FIG. 1 is a schematic diagram illustrating a functional block configuration of an application development support system according to an embodiment of the present disclosure.

FIG. 1 is a schematic diagram illustrating a functional block configuration of an application development support system 10 (application development environment) according to an embodiment. The application development support system 10 is realized, from a software perspective, as a program executed by a computer including a specified arithmetic unit and a specified storage unit, and realized, from a hardware perspective, by a computer executing the program and peripheral devices thereof (a display unit, an input/output unit, and the like).

The application development support system 10 includes a development tool unit 20, a build resource storing unit 30, and a build unit 40.

The development tool unit 20 is a software tool for providing an application (software) development environment and provides an integrated environment for supporting designing, coding, debugging, testing, and the like of an application, using a graphical user interface (GUI). Here, the development tool unit 20 manages the development environment of an application to be generated, in a unit called a "project". Specifically, at the time of generating an application, a user defines a project using the development tool unit 20 and edits source code and the like in the defined project.

The build resource storing unit 30 stores various files, libraries, and the like required at the time of building an application generated in the project.

The build unit 40 performs a build process using files, libraries, and the like stored in the build resource storing unit 30, thereby building a desired application. Here, the term "build" refers to generating execution code of an application on the basis of the files and the like in the build resource storing unit 30. In general, the term "build process" refers to process including compile and link steps and the like.

The build unit 40 includes a build execution unit 42, a file extraction unit 44, an interface inquiry unit 46, and a manifest file generation unit 48.

The build execution unit 42 is a program tool such as a complier for actually building an application on the basis of the build resource storing unit 30.

The file extraction unit 44 extracts, when there are a plurality of versions of platforms such as operating systems, common libraries required by all these platforms. Here, the term "extracting" refers to actually retrieving and arranging libraries in required locations in a project. Here, arrangement locations are not restricted, as long as a path for linking at build time is established. In addition, the term "common" refers to files being common among all the versions. The common files are fixed files.

Further, the file extraction unit 44 performs a process for searching for files required by a target platform after process for extracting commonly required libraries. Since it is necessary to distinguish between files and libraries for searching, extensions may be used for the distinction. Through this process, the file extraction unit 44 identifies libraries which are not common, but are required.

The interface inquiry unit 46 performs process for inquiring about public interfaces, relating to un-extracted libraries. Inquiring about interfaces includes searching for application programming interfaces (APIs) which can be used in the libraries by other applications. This process is declared in order to determine which API is used or not used by an application to be built, and is dynamically generated. A file describing this information, which may be called a manifest file, is required at build time by many development environments.

The manifest file generation unit 48 generates a manifest file regarding differences detected by the interface inquiry unit 46 and connects this file with an existing manifest file.

Figure 2:
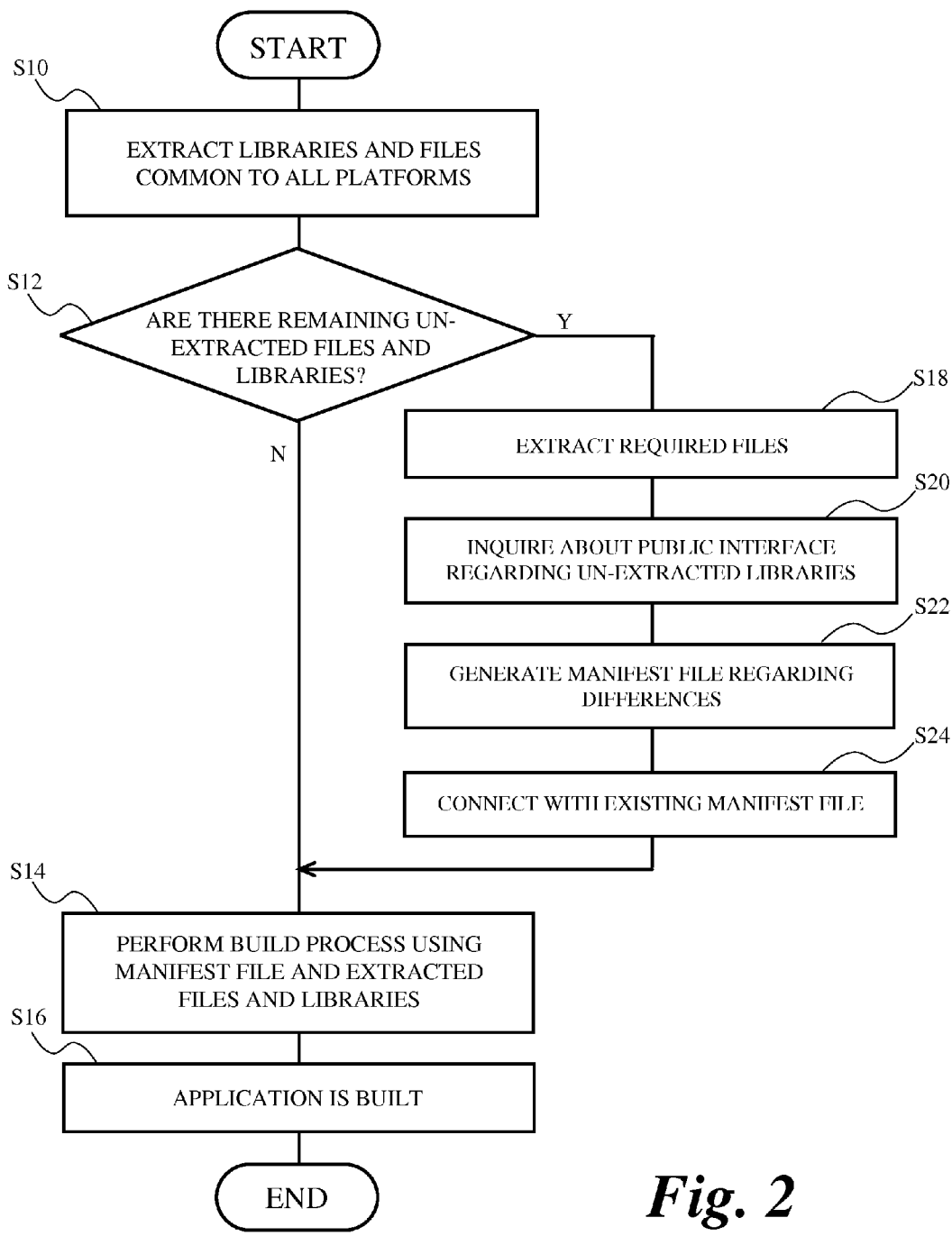
FIG. 2 is a flowchart of build process using the application development support system.

A process based on the configuration described above will be described. FIG. 2 is a flowchart of a build process performed by the application development support system 10.

A user makes a display unit display a development GUI through operation of the development tool unit 20, and starts the application generation process. First, the file extraction unit 44 extracts libraries and files common to all the platforms with reference to the build resource storing unit 30 (S10).

Next, the file extraction unit 44 determines whether or not there are remaining un-extracted files and libraries (S12). If nothing remains (N in S12), the build execution unit 42 performs a build process using a manifest file and extracted files and libraries (S14), whereby an application is built (S16).

When un-extracted files and/or libraries remain (Y in S12), the file extraction unit 44 searches for and extracts files required for a target platform (S18).

Then, the interface inquiry unit 46 performs a process for inquiring about public interfaces, regarding un-extracted libraries (S20).

Further, the manifest file generation unit 48 generates a manifest file regarding differences detected by the interface inquiry unit 46 (S22), and connects this file with the existing manifest file (S24). Then, an application is built (S16) by a build process (S14) performed by the build execution unit 42.

Figure 3:
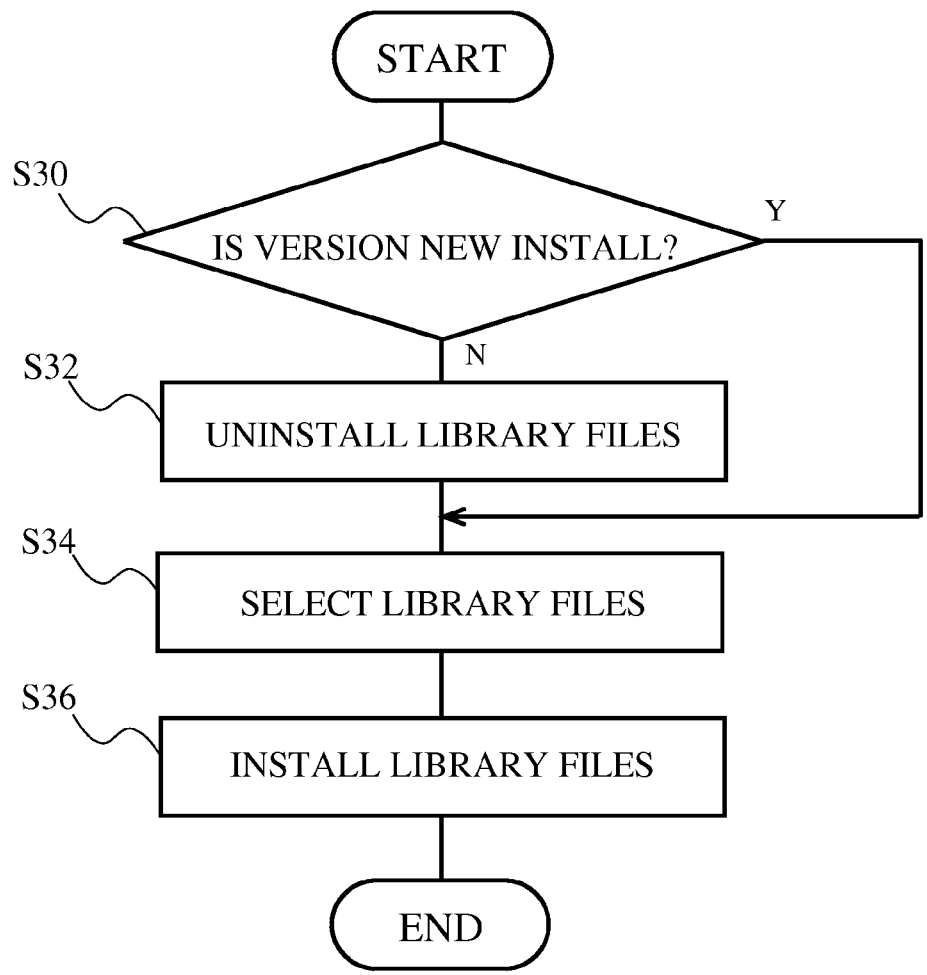
FIG. 3 is a flowchart of version switching process of the application development support system.

FIG. 3 is a flowchart of a process for switching the version of an application development environment. It is necessary to uninstall unnecessary files and install necessary files in order to switch the version of a target platform.

Hence, when a version for a target platform is installed, the development tool unit 20 determines whether or not the version is a new install (S30). When the version is not a new install (N in S30), the development tool unit 20 first uninstalls library files (S32), selects library files to be installed (S34), and performs an install (S36). In the case of a new install (Y in S30), the development tool unit 20 selects desired library files (S34) and performs an install (S36) without performing an uninstall process.

As described above, in an embodiment, necessary files, libraries, manifest files, and the like are stored in the build resource storing unit 30, and they are introduced at the time of installing a development environment. As a result, there is no need to provide a table or the like for storing associations with platform versions. With existing techniques, all files are stored and it is necessary to update the management table for them and prepare required files, libraries, and manifest files, and hence, there is a strong tendency for the install size of a development environment to be increased. However, according to an embodiment, the install size is not increased, and the capacity of the hardware resources of an installation destination can be effectively utilized.

Further, in an embodiment, version switching is performed at installation time, and required files are selected as needed.

As a result, no updating of a management table is required, and it is only required to install necessary files as an install package to add a platform version. Hence, it is not necessary to update, every time a version is added, a development environment to ensure that the development environment is adapted to the version.

It is very effective to employ the system described above particularly for open-source operating systems such as Android (registered trademark) and Linux (registered trademark), whose versions are frequently updated. Further, the above-described system, which does not require specific resources and process power, has an advantage in that there is almost no influence on other functions. Further, a development environment like this (the application development support system 10) is effective for generating applications related to image forming apparatuses such as a printer and a multi-function apparatus. In other words, some printers and multi-function apparatuses have a long life span from the viewpoint of practical process, and need to support, in particular, multiple operating systems (platforms). On the other hand, in personal computers, usable operating systems are usually limited to several generations (several versions) from the viewpoint of the process power and the like of the hardware. In this circumstance, regarding applications for image forming apparatuses, the use of the functionality of the present embodiment can enhance the convenience of customers in the environment of generating applications that support versatile platforms.

It should be understood that various changes and modifications to the embodiments described herein will be apparent to those skilled in the art. Such changes and modifications may be made without departing from the spirit and scope of the present subject matter and without diminishing its intended advantages. It is therefore intended that such changes and modifications be covered by the appended claims.

What is claimed is:

1. An application development support method for generating an application by building resources including a library and a manifest file, the method comprising:
    providing an application development environment for supporting designing, coding, debugging, and testing the application using a graphical user interface (GUI);
    managing the application development environment to be generated in a unit of a project;
    defining the project and editing source code in the defined project at the time of generating the application;
    extracting, when there are a plurality of versions of a platform serving as an operating system being an operation target for the application, a library commonly required by all the plurality of versions of the platform from a build resource storing unit;
    identifying and extracting a library that is not commonly required by all the plurality of versions of the platform but required from the build resource storing unit;
    inquiring about a public interface relating to an un-extracted library in the build resource storing unit, wherein inquiring about the public interface includes i) searching for an application programming interface (API) which is used in the library by other applications and ii) declaring and dynamically generating a process for inquiring about the public interface in order to determine which API is used or not used by the application to be built;
    generating a manifest file for a difference detected when inquiring about the public interface;
    connecting the generated manifest file with a manifest file existing in the build resource storing unit, wherein the manifest file describes information on declaring in order to determine which API is used or not used by the application to be built; and
    building the application on the basis of the library and the manifest file included in the build resource storing unit.

2. The application development support method according to claim 1,
    wherein building the application includes compile and link steps.

3. The application development support method according to claim 1,
    wherein extracting the library includes actually retrieving and arranging the library in required locations in the project.

4. An application development support system for generating an application comprising:
    a development tool unit that provides an application development environment for supporting designing, coding, debugging, and testing the application using a graphical user interface (GUI), and manages the application development environment to be generated in a unit of a project, wherein, at the time of generating the application, the development tool unit is used for defining the project and editing source code in the defined project;
    a build resource storing unit that includes a library and a manifest file at the time of building the application generated in the project; and
    a build unit that performs a build process,
    wherein the build unit includes:
    a build execution unit serving as a compiler that builds the application on the basis of the library and the manifest file included in the build resource storing unit;
    a file extraction unit that, when there are a plurality of versions of a platform serving as an operating system being an operation target for the application, i) extracts a library commonly required by all the plurality of versions of the platform, and ii) identifies and extracts a library that is not commonly required by all the plurality of versions of the platform but required from the build resource storing unit;
    an interface inquiry unit that inquires about a public interface relating to an un-extracted library in the build resource storing unit, wherein inquiring about the public interface includes i) searching for an application programming interface (API) which is used in the library by other applications and ii) declaring and dynamically generating a process for inquiring about the public interface in order to determine which API is used or not used by the application to be built; and
    a manifest file generation unit that generates a manifest file for a difference detected by the interface inquiry unit, and connects the generated manifest file with the manifest file existing in the build resource storing unit, wherein the manifest file describes information on declaring in order to determine which API is used or not used by the application to be built.

5. The application development support system according to claim 4,
    wherein the build process includes compile and link steps.

6. The application development support system according to claim 4,
    wherein the process for extracting the library includes actually retrieving and arranging the library in required locations in the project.

7. A non-transitory computer-readable medium having instructions stored thereon, for generating an application by building resources including a library and a manifest file, which causes a computer and peripheral devices to perform the following operations:

providing an application development environment for supporting designing, coding, debugging, and testing the application using a graphical user interface (GUI);

managing the application development environment to be generated in a unit of a project;

defining the project and editing source code in the defined project at the time of generating the application;

extracting, when there are a plurality of versions of a platform serving as an operating system being an operation target for the application, a library commonly required by all the plurality of versions of the platform from a build resource storing unit;

identifying and extracting a library that is not commonly required by all the plurality of versions of the platform but required from the build resource storing unit;

inquiring about a public interface relating to an un-extracted library in the build resource storing unit, wherein inquiring about the public interface includes i) searching for an application programming interface (API) which is used in the library by other applications and ii) declaring and dynamically generating a process for inquiring about the public interface in order to determine which API is used or not used by the application to be built;

generating a manifest file for a difference detected when inquiring about the public interface;

connecting the generated manifest file with a manifest file existing in the build resource storing unit, wherein the manifest file describes information on declaring in order to determine which API is used or not used by the application to be built; and building the application on the basis of the library and the manifest file included in the build resource storing unit.

8. The non-transitory computer-readable medium according to claim 7, wherein building the application includes compile and link steps.

9. The non-transitory computer-readable medium according to claim 7, wherein extracting the library includes actually retrieving and arranging the library in required locations in the project.

* * * * *